(12) United States Patent
Greene (10) Patent No.: US 8,022,927 B1
(45) Date of Patent: Sep. 20, 2011

(54) LOW-COST GRAPHIC INPUT DEVICE WITH UNIFORM SENSITIVITY AND NO KEYSTONE DISTORTION

(76) Inventor: Richard M. Greene, San Rafael, CA (US)

( * ) Notice: Subject to any disclaimer, the term of this patent is extended or adjusted under 35 U.S.C. 154(b) by 1042 days.

(21) Appl. No.: 11/825,789

(22) Filed: Jul. 9, 2007

Related U.S. Application Data (60) Provisional application No. 60/832,814, filed on Jul. 24, 2006.

(51) Int. Cl.
*G09G 5/00* (2006.01)

(52) U.S. Cl. ............ 345/156; 348/61; 348/552; 348/707

(58) Field of Classification Search .................... 345/156
See application file for complete search history.

(56) References Cited

U.S. PATENT DOCUMENTS

| | | | |
|---|---|---|---|
| 4,763,173 A | | 8/1988 | Harrigan et al. |
| 4,911,529 A | * | 3/1990 | Van De Ven .................. 359/454 |
| 5,619,586 A | | 4/1997 | Sibbald |
| 5,940,149 A | * | 8/1999 | Vanderwerf ...................... 349/5 |
| 7,061,680 B2 | * | 6/2006 | Huber ........................... 359/501 |
| 7,230,758 B2 | * | 6/2007 | Huang ........................... 359/457 |
| 7,262,816 B2 | * | 8/2007 | McDowall et al. ........... 348/745 |

* cited by examiner

*Primary Examiner* — Alexander Eisen
*Assistant Examiner* — Kenneth B Lee, Jr.

(57) ABSTRACT

The invention provides a graphic input device which has uniform sensitivity and is free of keystone distortion but which is lighter and less expensive to manufacture than the prior art, particularly for large drawing surfaces. It uses Fresnel optics to reduce the cost, thickness, and weight of the prism or collimator or both. Means are provided to mitigate the effects of lens flare from the Fresnel optics, minimize the thickness of the device, and to correct any remaining distortion in the camera's image using software executing on a standard computer.

10 Claims, 7 Drawing Sheets

LOW-COST GRAPHIC INPUT DEVICE WITH UNIFORM SENSITIVITY AND NO KEYSTONE DISTORTION

CROSS-REFERENCE TO RELATED APPLICATIONS

This application claims priority from U.S. Provisional Patent Application Ser. No. 60/832,814 filed Jul. 24, 2006, the disclosure of which is incorporated here by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

A computer graphic input device that uses a prism to provide the input sensitive drawing surface has been described by Richard Greene in U.S. Pat. No. 4,561,017, the disclosure of which is incorporated by reference. An improved version of that device that adds a collimating lens to provide uniform sensitivity and no keystone distortion has been described by Richard Greene in U.S. Pat. No. 5,181,108, the disclosure of which is also incorporated by reference. Both devices use conventional prisms and the latter device uses conventional collimators, each of which has continuous surfaces and therefore requires a great deal of transparent material, is expensive to manufacture, and is heavy in weight, for all but the smallest drawing surfaces.

Those devices also required specialized optics or cameras to correct for rectangular distortion that remained in the image, which are also expensive.

BRIEF SUMMARY OF THE INVENTION

The invention provides a graphic input device which has uniform sensitivity and is free of keystone distortion but which is lighter and less expensive to manufacture than the prior art, particularly for large drawing surfaces. It uses Fresnel optics to reduce the cost, thickness, and weight of the prism or collimator or both. Fresnel optics are commonly used in non-imaging applications to reduce the amount of material required in an optical component and thereby reduce its size, weight, and manufacturing cost. They may be readily molded, stamped, or embossed, at low cost, using a variety of transparent materials such as plastic and glass. However, their faceted groove structure causes problems that usually prohibit their use in imaging applications such as this one. Therefore steps must be taken as detailed below to mitigate those issues for this application. For one thing, if the size of their facets is sufficiently small compared to the resolution of the camera and computer, they may be used in this device. Fresnel collimators are further subject to lens flare (also known as veiling glare or ghosting) caused by reflection or scattering of light from their grooves, which would also degrade the image and thereby interfere with the operation of the device if not mitigated. Hence extra light baffling means and positioning constraints must be employed to prevent such interference. The invention also provides the means to correct rectangular distortion or other distortion remaining in the camera's image using software executing on standard low-cost computing hardware.

More specifically, a graphical input device is disclosed which includes a transparent material where one surface thereof defines a drawing surface. The index of refraction of the material is greater than the index of refraction of the medium on one side of the drawing surface. A camera is mounted on the other side of the drawing surface in a manner to capture light rays that have been totally internally reflected from the drawing surface. A collimator is mounted between the camera and the drawing surface such that its focal point is coincident with the camera's viewpoint and its principal surface is normal to the camera's optical axis.

By this arrangement, an object located on the upper side of the drawing surface will be imaged by the camera only when and where the object is in direct contact with the drawing surface. By placing the camera's viewpoint at the focal point of the collimator, the principal image forming rays will all be parallel within the transparent material. Thus they will intersect the drawing surface in equal angles, providing equal sensitivity everywhere. By making the optical axis of the camera normal to the principal surface of the collimator, these rays will all be made to traverse equal distances while converging towards the viewpoint. Thus keystone distortion is prevented.

In the preferred embodiment, the drawing surface is defined by the large flat face of a transparent triangular Fresnel prism and the collimator is defined by a separate Fresnel lens. A video camera views the drawing surface through the prism facets facing in one direction and through the collimating lens. Since the angle of view is greater than the critical angle, the only light which the camera receives when nothing is touching the drawing surface is that which has reached it by total internal reflection. Thus only those portions of a drawing tool which are in direct contact with the drawing surface can be seen by the camera. Since the angle of view is constant across the surface, so is the responsiveness of the camera to such drawing tools and its immunity to noise produced by unwanted disturbances of that surface. The camera's output may be digitized, processed, and displayed on a video monitor. Such processing includes the removal of rectangular distortion or other distortions that remain in the camera's image.

Light that enters the drawing surface from objects which are not in direct contact with it can still reach the collimator, at angles which will not be visible to the camera if the collimator is a conventional solid lens. However, the facets and grooves on a Fresnel lens can cause reflection or scattering of that light into the camera's field of view that could be mistaken for a drawing tool in contact with the drawing surface, or reduce the needed contrast in the images of those tools. To minimize that interference from external light sources, the Fresnel collimator is located as far away from the drawing surface as possible and light baffling material is placed around the optical path between the collimator and the prism.

For devices that are designed to image bright tools against a dark background, illumination could be provided in the prior art by light sources on the same side of the collimator as the camera, shining through the collimator onto the drawing surface. However with a Fresnel lens collimator, that will cause backscattering and reflections from the grooves and facets of the Fresnel collimator that would result in unacceptable image degradation. The drawing surface may instead be illuminated by light sources located between the collimator and the prism. In such cases, those internal light sources must be provided with baffles that prevent their light from reaching the camera lens. With a Fresnel collimator, those baffles must extend far enough to prevent the illumination from reflecting or scattering off the Fresnel collimator grooves and into the camera's field of view.

BRIEF DESCRIPTION OF THE SEVERAL VIEWS OF THE DRAWING

The preferred embodiment of the invention will be further described in connection with the accompanying drawings, in which.

DETAILED DESCRIPTION OF THE INVENTION

Figure 1:
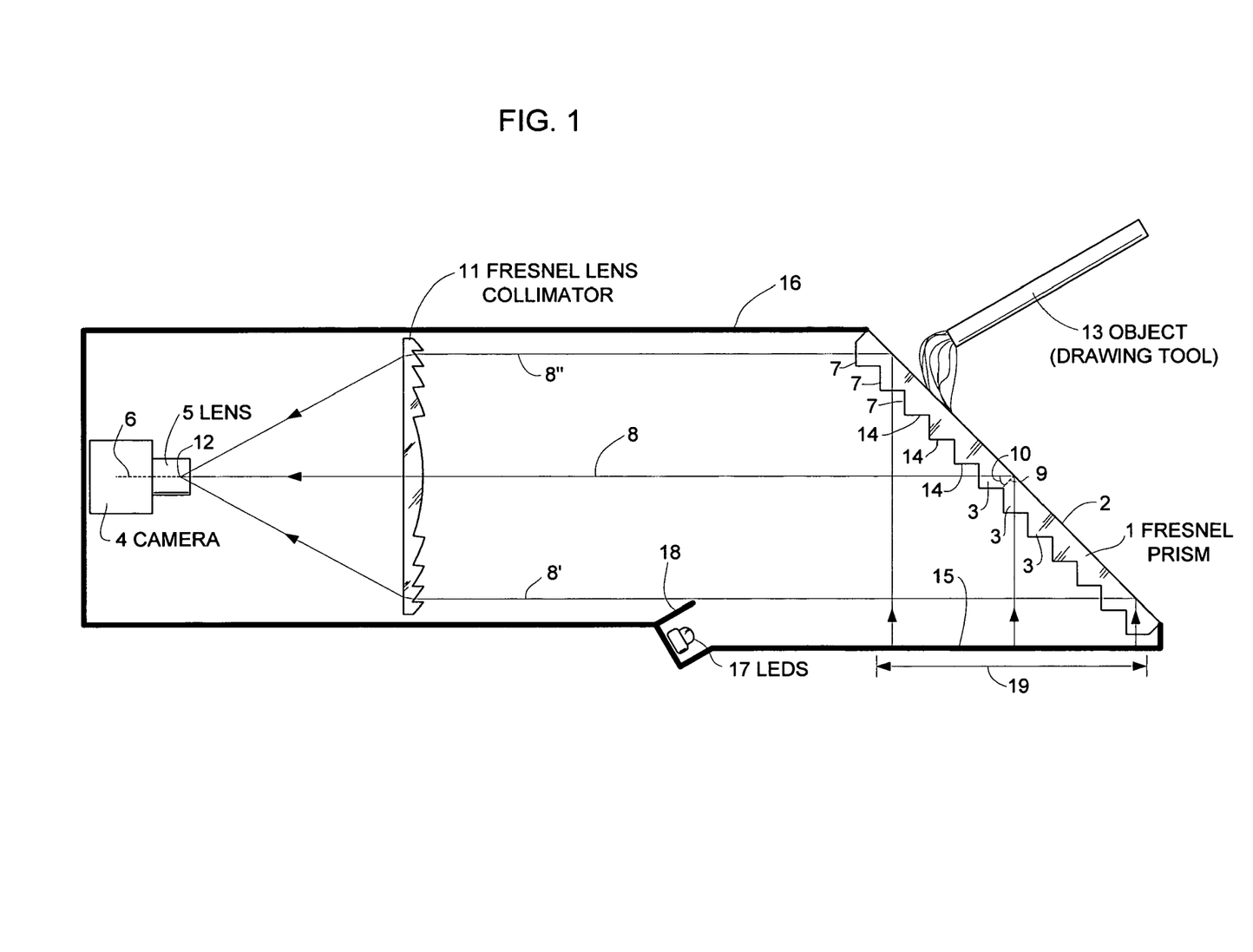
FIG. 1 is a schematic showing of the preferred graphic input device.

The preferred construction of the device is shown schematically in FIG. 1. It uses a large Fresnel prism 1 composed of a transparent material with an index of refraction significantly greater than that of the surrounding air. It has a large flat surface 2 that provides the drawing surface and a multiplicity of small facets 3, each of which has the same triangular cross section and extends linearly in the direction perpendicular to the figure. It also employs a camera 4 that includes a lens 5 with an optical axis 6. In the preferred implementation, the camera produces a digital video signal that may be processed and displayed in conventional ways. The camera is positioned so that it views the drawing surface of the prism through the surfaces 7 of the prism facets oriented towards the camera and so that the ray of light 8 which travels along the optical axis of the camera intersects the drawing surface normal 9 in an angle 10 which is greater than the critical angle for the material of the prism in air. A Fresnel lens collimator 11 is positioned with its optical axis substantially collinear with the optical axis of the camera. The collimator is also positioned such that its focal point 12 is coincident with the primary nodal point of the camera lens, which is the camera's viewpoint. This causes all of the principal image forming rays, including the most extreme principal rays 8', 8", to be parallel in the space between the collimator and the prism as well as within the prism itself. Therefore, they will all intersect the drawing surface normal in the same angle as the central ray 8.

Thus when nothing but air is in contact with the drawing surface, the only light which can reach the camera is that which has been totally internally reflected within the prism from that surface. If an object 13 which provides a drawing tool is brought into direct contact with the drawing surface, then the layer of air necessary for total internal reflection will be eliminated at the points of contact, and the camera will be able to view those points of the object. Since the camera views the drawing surface at the same angle everywhere, the sensitivity of the device will also be constant across that surface.

In order to maximize the signal to noise ratio, the brightness contrast between drawing tools and the internally reflected background must be maximized. For light colored tools, this may be accomplished by covering in opaque black the surfaces 14 of the prism facets oriented parallel to the optical axis of the camera and collimator, which are viewed by the camera in reflection from the drawing surface. Such dark covering may be applied directly to the faces 14 or it may be provided by black material 15 separated by some distance from the prism. That material may conveniently be part of a larger opaque black enclosure or baffle 16 that keeps external illumination from reaching the camera. The drawing tools may then be illuminated by LEDs 17 which send their light through the lower surfaces 7, 14 of the prism. Opaque baffles 18 prevent light from the LEDs from reaching the camera by scattering or reflection from the Fresnel collimator's grooves.

Alternatively, for dark colored drawing tools, the background can be provided with a diffuse light source, such as an electroluminescent or fluorescent panel, in the region 19. However, in devices that use a Fresnel collimator, that light source may reflect and scatter from the grooves in the Fresnel lens, thereby causing lens flare that reduces the contrast of images of the drawing tools. Hence for devices that use a Fresnel lens collimator, a dark background and light colored drawing tools are preferred.

Since the optical axis of the camera and collimator are substantially collinear, the principal rays all traverse equal distances while converging from that surface to their focus at the camera's viewpoint. Thus rays such as 8' and 8", which subtend equal angles from the central ray 8 where they are converging, will be separated from it by equal distances where they are parallel and will intersect the drawing surface at points equally spaced from the point of intersection of the central ray. In other words, the more distant portions of the drawing surface will appear just as large as the nearer portions, and so no keystone distortion occurs. The collimator has effectively placed the camera's viewpoint at infinity, so that the camera's image is an oblique parallel projection of the drawing surface, rather than a perspective projection.

Since the projection of the drawing surface must be oblique rather than orthogonal (in order to view it from an angle greater than the critical angle), rectangular distortion will still be present. That is, the image of the drawing surface will be foreshortened, or demagnified, in the vertical direction (the dimension in which the surface is tilted with respect to the optical axis). This distortion may be corrected by processing the camera's image using software running either on a host computer's central processor or on its graphic display adapter. Such software needs only to resize the image in one dimension, using standard sampling and filtering algorithms. This also helps to minimize the cost of the device by eliminating the need for custom anamorphic lenses or specialized cameras. Any residual distortion such as barrel or pincushion distortion resulting from aberrations or aperture stops in the camera lens and/or collimator may also be corrected by image processing hardware and/or software that applies an image warping algorithm. If the Fresnel collimator has one flat (piano) side, that side should be faced towards the camera to minimize spherical aberration.

Since the camera views the drawing surface from the side opposite the user, it is also necessary to reverse the camera's image. This may be done by reversing the scanning direction within the camera or by including an odd number of mirrors in the optical path between the camera and drawing surface. The latter approach has the advantage of providing a more compact device and allows for more convenient placement of the camera.

The collimator must be somewhat wider than the part of the drawing surface to be imaged, and higher than the foreshortened height of that portion of the drawing surface. The extra width and height is necessary to accommodate the marginal rays through the camera's lens, in order to avoid vignetting.

Figure 2A:
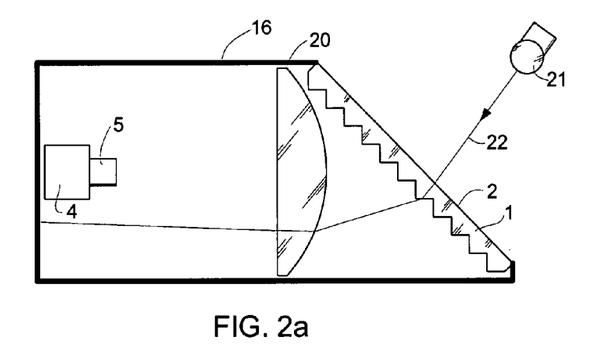
FIGS. 2a, 2b, and 2c are schematic showings of the placement of the collimator.
Figure 2B:
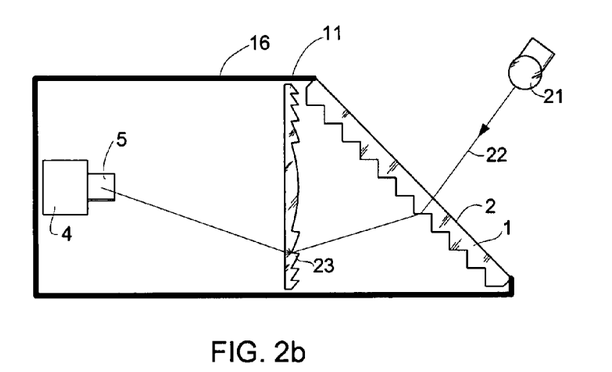
Figure 2C:
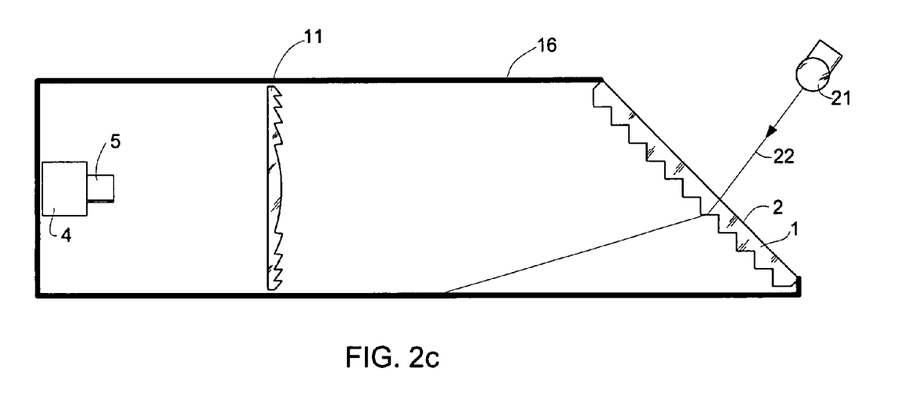

The placement of the collimator lens is shown schematically in FIGS. 2a-2c. In a placement based on the prior art as shown in FIG. 2a, a conventional (non-Fresnel) collimator 20 may be located as close to the prism as physically possible. However, such an arrangement is not suitable when a Fresnel lens is used as the collimator. To see why, consider what happens when an external source of illumination 21, such as room lights, sends light into the prism through the drawing surface. A ray of light 22 may enter at an angle such that it is refracted by the prism towards the collimator. However, since that ray will not be parallel to the optic axis of the collimator, it will not be able to reach the camera lens at the collimator's focal point. It will instead be simply refracted by the collimator to a point where it is absorbed by the enclosing baffle 16. Hence external illumination will not be visible to the camera and will not interfere with images of drawing tools in direct contact with the drawing surface.

In contrast, FIG. 2b shows what happens if a Fresnel lens collimator 11 is located very close to the prism. The same ray 22 from the external illumination 21 may now reflect or scatter from a facet 23 of the Fresnel collimator, at an angle such that it may enter the camera's lens. Thus by placing the collimator too close to the prism, external illumination causes lens flare that interferes with the camera's image of drawing tools, thus degrading the performance of the device in illuminated environments.

FIG. 2c shows the preferred placement for a Fresnel lens collimator 11. By placing it at a sufficient distance from the prism, light rays 22 from external illumination 21 that otherwise could have reflected or scattered off of its grooves and facets are now instead absorbed by the enclosing baffle 16 before they can reach the collimator or the camera, and are thereby prevented from interfering with the images of tools on the drawing surface. It should be understood that whereas FIGS. 2a-2c show only a single example ray for illustrative purposes, there will be many rays from illumination sources external to the device that would cause interfering reflections and scattering from a Fresnel collimator placed too close to the prism as in FIG. 2b but which will not cause such interference if the Fresnel collimator is moved back as in FIG. 2c. The exact distance that the Fresnel collimator must be removed from the prism will depend on the size and geometry of the prism, but may be found by moving the collimator and camera away from the prism until room illumination ceases to be a significant problem. Though this tends to make the device larger than may be desired, it is necessary if the device is to be useable in environments with normal room illumination. Again, optical path folding mirrors may be used to make the device more compact.

Since in the preferred configuration the Fresnel collimator lies far from the drawing surface, its grooved structure will normally be invisible to the camera, unless the camera lens has an extremely large depth of field. In any event it is desirable to make the circular grooves as finely spaced as possible, or in other words to maximize the number of grooves per unit distance, to prevent the edges of the grooves from being resolved by the camera and the computer. The Nyquist sampling theorem indicates that ideally there should be at least two grooves per pixel in the digitized image from the camera, though in practice, coarser groove spacing may be acceptable, especially if the depth of field of the camera lens is not too great. Note that the representation of the Fresnel collimator in FIGS. 1, 2b, and 2c is schematic in that it shows grooves that are disproportionately large for the preferred device.

The Fresnel prism which forms the drawing surface will normally have its grooves close to that drawing surface, since one of the main reasons for using a Fresnel prism in this device is to reduce the thickness that would be required in a conventional prism with the same apex angle. Therefore, those grooves could cause visible image artifacts unless they too are small compared to the resolution of the camera and computer in the direction perpendicular to the linear grooves. Again the Nyquist sampling theorem indicates that ideally there should be at least two grooves per pixel in the digitized camera image, and again the schematic representation of the Fresnel prism in FIGS. 1 and 2a-2c shows grooves that are disproportionately large for the preferred device. For a camera that produces digital images 600 pixels high of a drawing surface 7.5" high, the preferred minimum groove frequency is therefore 2×600/7.5" or 160 grooves/inch. In practice, coarser groove spacing may also be acceptable.

Figure 3A:
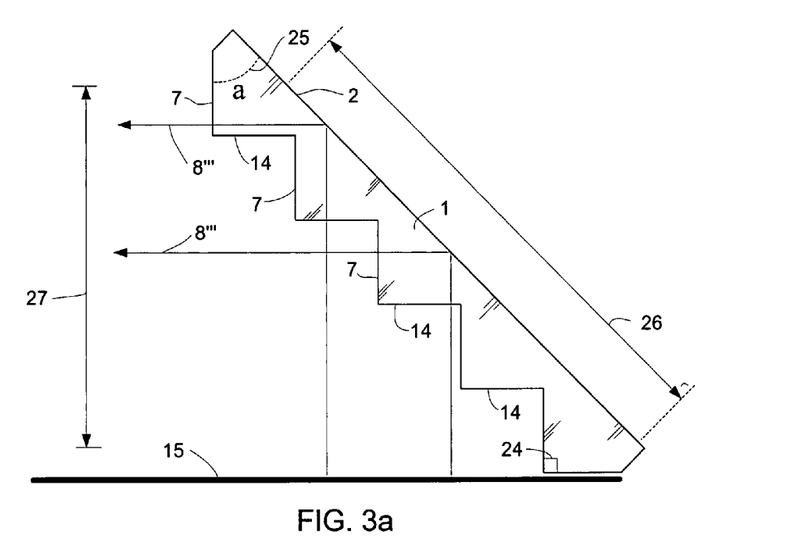
FIGS. 3a and 3b are cross-sectional views of two Fresnel prisms with different facet angles.
Figure 3B:
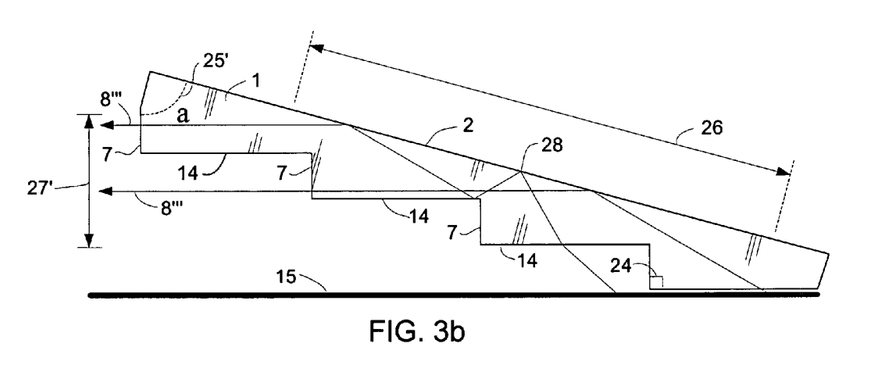

The preferred shape of the grooves in the Fresnel prism is shown in FIGS. 3a and 3b, which are cross sections perpendicular to the linear extent of those grooves. These figures only show a small number of grooves for illustrative purposes, but it should be understood that Fresnel prisms would normally contain a large number of grooves as discussed above. Since the principal image forming rays of light 8''' leaving the drawing surface 2 are parallel, the groove surfaces 7 through which the camera views the drawing surface should also be parallel. In order to avoid gaps or double images in the camera's view of the drawing surface, those surfaces 7 should be perpendicular to the principal rays 8''' and also be perpendicular to the groove surfaces 14 that are viewed by the camera in total internal reflection from the drawing surface. Thus the apex angles 24 of the prism facets should be 90°.

FIG. 3a shows the most common form of a Fresnel prism that meets the above criteria. It is one in which the surfaces 7 make an angle α 25 of 45° with the drawing surface. Thus the groove surfaces 7 and 14 have equal widths and make equal angles with the drawing surface, such that in cross section the prism facets form isosceles right triangles. Such a Fresnel prism is sometimes referred to as a Fresnel beamsplitter, and we will refer to it here as the isosceles form.

FIG. 3b shows an alternate form of a Fresnel prism that also satisfies the above criteria. That is, the groove surfaces 7 are parallel to each other and perpendicular to the principal rays 8''' and to the surfaces 14, resulting in apex angles 24 of 90°. However in this case the surfaces 7 make an angle α 25' of greater than 45° with the drawing surface. Thus the widths and angles to the drawing surface of groove surfaces 7 are not equal to those of surfaces 14, and the prism facets form scalene triangles in cross section. This form of the Fresnel prism, which we will refer to as scalene, has the advantage over the isosceles form that it enables a reduction in the physical height of the device, for a given size 26 of drawing surface. That is because the black background 15 can make a shallower angle with respect to the drawing surface, and the height of the collimator can also be reduced, since the camera views the drawing surface at this more oblique angle. The minimum height 27 in FIG. 3a or 27' in FIG. 3b of both the device and the collimator is proportional to the cosine of α, times the imaged extent 26 of the drawing surface.

Another advantage of the scalene form is that the camera views the drawing surface at a greater angle to the surface normal, as compared with the isosceles form. The principal rays 8''' intersect the drawing surface at an angle to its surface normal that is equal to α, so the greater the angle α, the greater the angle of reflection at the drawing surface. The camera must view the drawing surface at an angle greater than the critical angle, so that it will only image the background by total internal reflection when no objects are in contact with the drawing surface. In order to ensure that, the refractive index of the prism material must be greater than 1/sin α. Thus for the isoceles form, the prism material must have a refractive index greater than 1.414, but materials with lower indices of refraction could be used with the scalene form. For prism material of a given refractive index, the device can be made less sensitive to water droplets or other imperfections of the drawing surface by using the scalene form, which has a greater angle of reflection at the drawing surface than the isoceles form.

However, there are limits to how large the angle α can be made. If it and the refractive index of the prism material are both too large, then total internal reflection may even occur where objects are in contact with the drawing surface, or a film of liquid on that surface, thereby making drawing tools invisible to the camera and ineffective. Also, as the camera's view of the drawing surface becomes more oblique, more image foreshortening will occur, thereby increasing the amount of rectangular distortion that will need to be corrected. If such correction is not performed optically before the image reaches the camera, then the total imaged extent 26 of the drawing surface will occupy a smaller vertical extent of the camera's light sensitive surface, thereby degrading the resolution in that direction.

Yet another potential problem with the scalene form is caused by the fact that its lack of symmetry means that the principal image forming rays 8''' do not originate from the background in a direction perpendicular to the prism faces 14. Thus if the angle α is too large, it is possible for a single ray to have multiple internal reflections from the drawing surface, as shown at 28, thus potentially leading to multiple images of a single drawing tool object. The extent of this problem depends on the imaged extent of the drawing surface, the thickness of the scalene Fresnel prism, and the refractive index of the prism material as well as how large the angle α is. This problem can be avoided if the black background is applied directly to the faces 14 of the Fresnel prism (or internal to the prism as discussed below), so that no internal reflections may occur there.

Figure 4:
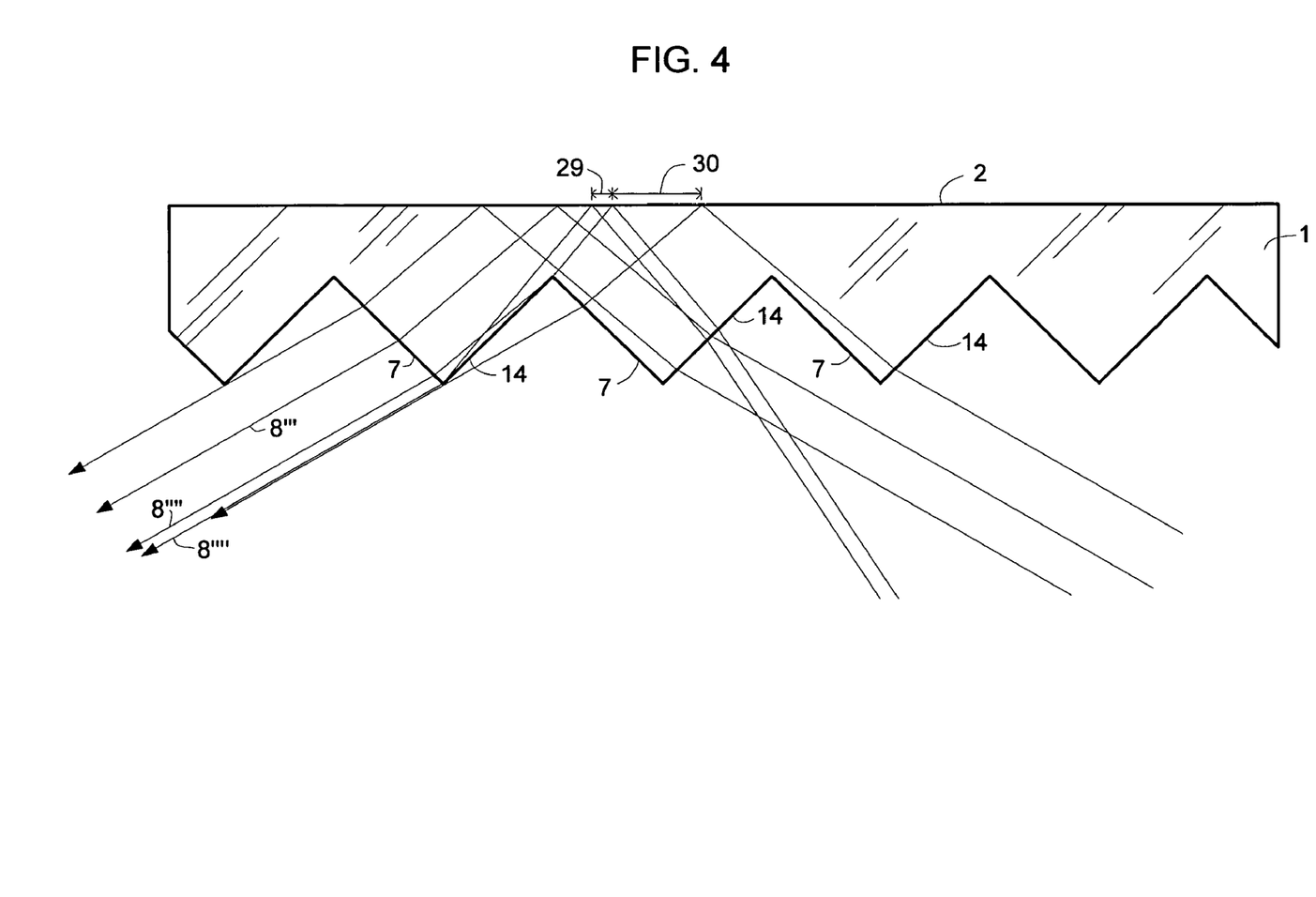
FIG. 4 is a cross-sectional view of a Fresnel prism imaged from an angle not perpendicular to the prism facets.

FIG. 4 shows that it is also possible to use a Fresnel prism in an alternate configuration wherein the principal image forming rays 8''' are not perpendicular to the faces 7 of the prism. Because of the camera's angle of view in this case, some of those rays 8'''' will be reflected from the faces 14 before exiting the prism, and thereby for each facet of the Fresnel prism one strip 29 of the drawing surface will be doubly imaged. By the same token, again for each facet, an adjacent strip 30 of the drawing surface will not be reachable by any of the principal image forming rays, and hence will be largely invisible to the camera. Thus the camera's image of the drawing surface, instead of being continuous, will consist of a series of alternating strips of normal image portions and doubled image portions, and a drawing tool feature so small as to fit entirely within one of the invisible strips will not be imaged at all. However, as long as the Fresnel prism facets are small enough, this configuration may be acceptable. If the facet spacing exceeds the Nyquist limit of two grooves per pixel, then the strips of the drawing surface that are doubly imaged or invisible will be below the resolution of the camera. This configuration then, by allowing a more oblique view of the drawing surface, provides similar advantages to those of the scalene form of the Fresnel prism, namely enabling reduced device height and greater immunity to water droplets and surface imperfections for a given refractive index. While FIG. 4 shows the isoceles form of the prism, the scalene form can also be viewed from an angle that is not perpendicular to the faces 7 of the prism, to enhance its advantages still further. Also, while FIG. 4 shows only a small number of grooves for illustrative purposes, it should be understood that Fresnel prisms of this configuration would normally contain a large number of grooves as discussed above.

Fresnel prisms of the isoceles form are readily available commercially. In addition to individual molded plastic prisms in that form, they are also available as a film from at least two manufacturers. One is Optical Lighting Film (OLF) manufactured by 3M Corp. OLF has a thickness of 0.020" and 71.4 prism grooves/inch. Another is Reflexite Collimating Film (RCF) manufactured by Reflexite Display Optics. RCF has a thickness of 0.002" to 0.009" and 529 prism grooves/inch. Either of these films requires additional support if they are to serve as a drawing surface subject to significant pressure from the use of drawing tools. The preferred way to provide that support is by laminating the film to a more rigid piece of transparent material such as a sheet of glass or plastic. Plastic Fresnel prisms which are thick enough not to require additional support may also benefit by laminating them to another transparent sheet, which provides greater strength, rigidity, wear resistance, a more wettable surface, lower cost, or some combination of those and other qualities. The preferred way to use either OLF, RCF, or other Fresnel prisms molded from plastics such as acrylic or polycarbonate is by laminating them to a piece of tempered glass, whose surface then becomes the effective drawing surface. When plastic Fresnel prisms such as these are subjected to normal use of drawing tools, they are easily scratched or abraded and they flex by unacceptable amounts. They also have relatively low surface energy which causes water and other liquids to bead up on the drawing surface, which can interfere with the use of the device when those droplets with high contact angle refract external room illumination in such a way as to be imaged by the camera. Glass provides a stronger surface and one that has high surface energy making it more wettable, thereby reducing the contact angle of liquid droplets, making them flatter and less likely to be imaged by the camera. Tempered glass provides even greater strength and resistance to scratches, abrasion, or other surface damage that would also tend to degrade the performance of the device.

Figure 5:
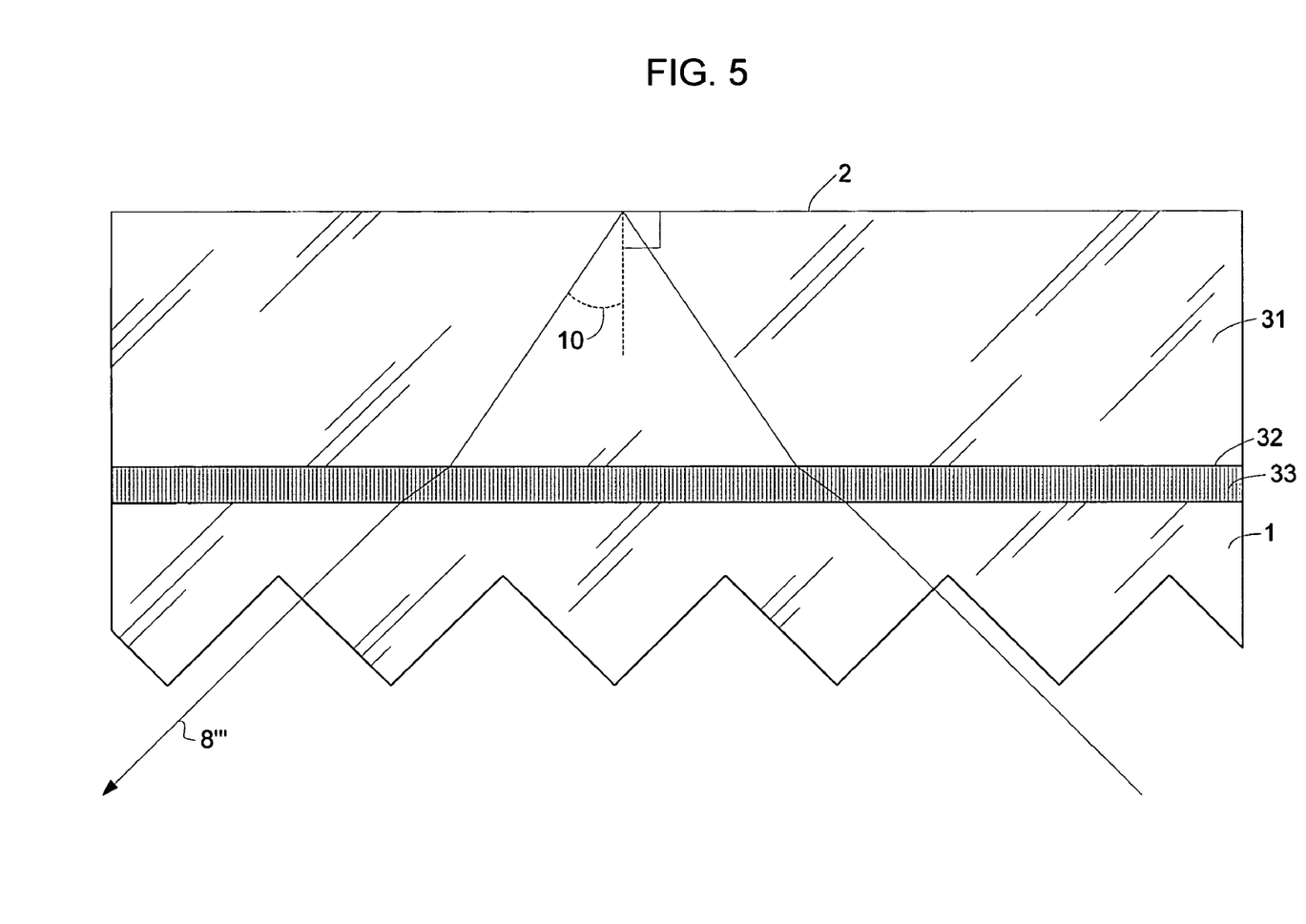
FIG. 5 is a cross-sectional view of a Fresnel prism laminated to a supporting sheet.

FIG. 5 shows a Fresnel prism 1 laminated to a flat sheet of transparent supporting material 31 such as tempered glass having two substantially parallel surfaces 2 and 32. A transparent adhesive 33 bonds the prism and the support together. The non-laminated surface 2 of the supporting sheet then forms the effective drawing surface of the Fresnel prism, and indeed, the entire composite assembly of prism, adhesive, and support may therefore be regarded as functionally equivalent to a single homogeneous Fresnel prism. Though FIG. 5 shows the isoceles form of a Fresnel prism, the scalene form may be laminated to a support in the same way. Thus in FIGS. 1, 2*a-c*, 3*a-b*, 4, and 6 each of the unitary Fresnel prisms 1 may also be replaced by a composite prism as shown in FIG. 5. Though FIG. 5 shows only a few facets of such a prism, it may be regarded as a magnified view of a small section of a larger prism with hundreds or thousands of facets.

The adhesive must be fee of voids, air bubbles, or other impurities that would interfere with the camera's image of the drawing surface. It must also have sufficient compliance to accommodate any differences in thermal expansion of the Fresnel prism material 1 and the support material 31. A clear silicone elastomer such as Sylgard 184 manufactured by Dow Corning Corp., or clear flexible epoxies may be used as the adhesive.

Note that the extra thickness imposed by the adhesive and the support, and differences in their refractive index from that of the underlying Fresnel prism material do not impede the operation of the device. A principal image forming light ray 8''' is shown passing through all of those layers, bending at each interface due to differences in the refractive index of each material. For the isosceles form of the prism as shown in FIG. 5, the angle between the entering and exiting rays is still 90°, even though the angles of incidence and reflection 10 at the drawing surface are no longer 45°. That is also not a problem, as long as those angles are greater than the critical angle for the supporting material 31 in air, so that total internal reflection occurs at the drawing surface. In the figure, the direction of refraction illustrated at each interface implies that the refractive index of the support material is greater than that of the prism material, which is in turn greater than that of the adhesive. However, that is not required for the operation of a composite Fresnel prism. The adhesive may have a higher refractive index than the prism material and/or the support and the prism material may have a greater refractive index than the support.

An alternative to the use of an adhesive is to use a layer of oil or other liquid in the same position 33 to optically couple the Fresnel prism material to the support 31 and provide an effective lamination. Means must then be provided to prevent that liquid from escaping or for air bubbles to be entrapped where they could be imaged by the camera.

Another alternative laminated form is one in which the Fresnel prism of one material is molded directly onto a supporting sheet of another material. One method to achieve that is to use Sylgard 184 and a glass support in a configuration initially similar to what is shown in FIG. 5, but with a Fresnel prism master turned upside down. Thus instead of its continuous surface, the triangular facets of the Fresnel prism master are temporarily bonded to the support. Once the Sylgard has hardened, the Fresnel prism master is then removed, leaving its facets replicated in the lower surface of the Sylgard 184, which thereby forms a Fresnel prism.

Figure 6:
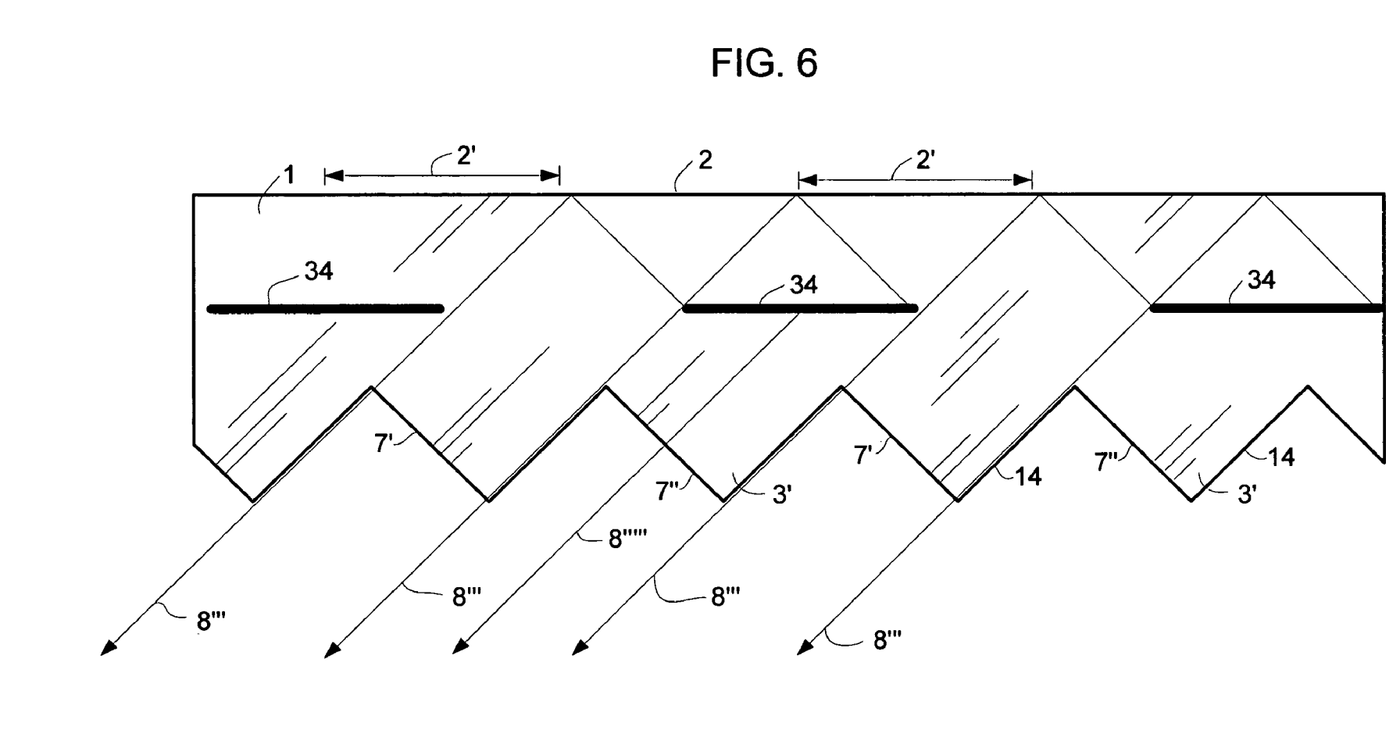
FIG. 6 is a cross-sectional view of a Fresnel prism containing the black background within it.

An alternate method of supplying the black background is to place it inside a Fresnel prism 1 as shown in cross section in FIG. 6. In this case the principal image forming rays 8''' that emerge from one set of faces 7' originate from black stripes 34 that are embedded within the prism itself and aligned with those prism facets. These stripes may be printed on a film such as OLF or RCF or other Fresnel prism material before it is laminated to a support, or printed on the support itself, or printed on a third material that is laminated to both the support and the material that provides the Fresnel prism facets. They may also be molded directly into the Fresnel prism material. Note that principal image forming rays 8'''' from the alternating set of faces 7'' originate from the black background as well, but do so without being reflected at the drawing surface 2. Thus the black stripes obscure half the total the drawing surface area 2', and therefore this approach is only practical if the facet spacing, and hence the black stripe spacing, is less than the resolution of the camera. Again, the ideal spacing would provide more than two black stripes per pixel in the camera's image in this dimension, and again, FIG. 6 shows only a few facets for illustrative purposes. The main advantage of such an approach is the same one that could be achieved by placing the dark background directly on the faces 14, namely that by eliminating the need for a separate background such as 15 in FIG. 1, an optical path folding mirror may be placed very near the Fresnel prism, thereby allowing the physical height of the device to be reduced by almost half. The advantage of providing the black background within the prism as shown in FIG. 6, as compared to providing it directly on the faces 14, is that it is easier to print black stripes on a flat surface than on the angled faces of a Fresnel prism. Such stripes may be printed by inkjet, lithography, photographically, or other means well known in the printing arts. Note that since no useful image forming rays emerge from the set of facets 3', those facets could actually be replaced by flat surfaces parallel to the drawing surface. While FIG. 6 shows the internal black background stripes used with the isosceles form of Fresnel prism, they could also be used with the scalene form as in FIG. 3b and/or with a non-perpendicularly viewed prism as in FIG. 4, provided the black stripes are appropriately aligned with the prism facets.

Figure 7A:
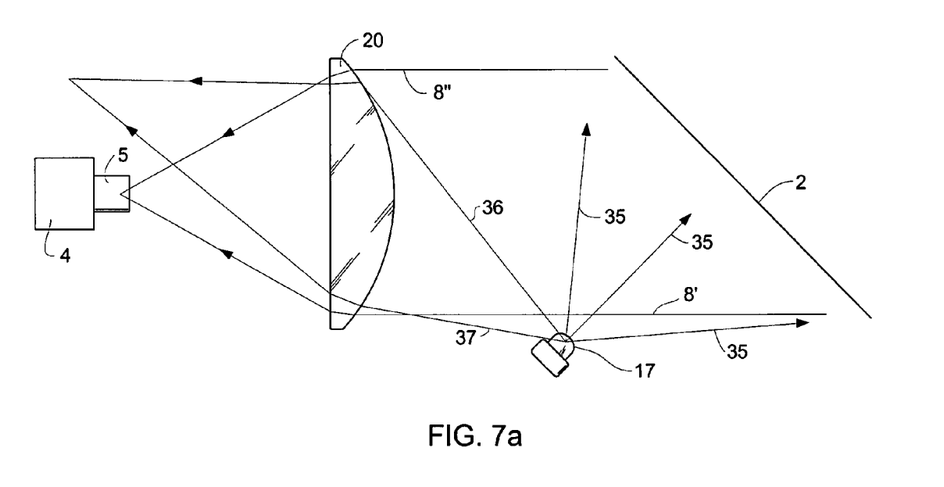
FIGS. 7a and 7b are schematic showings of an internal light source and baffle.
Figure 7B:
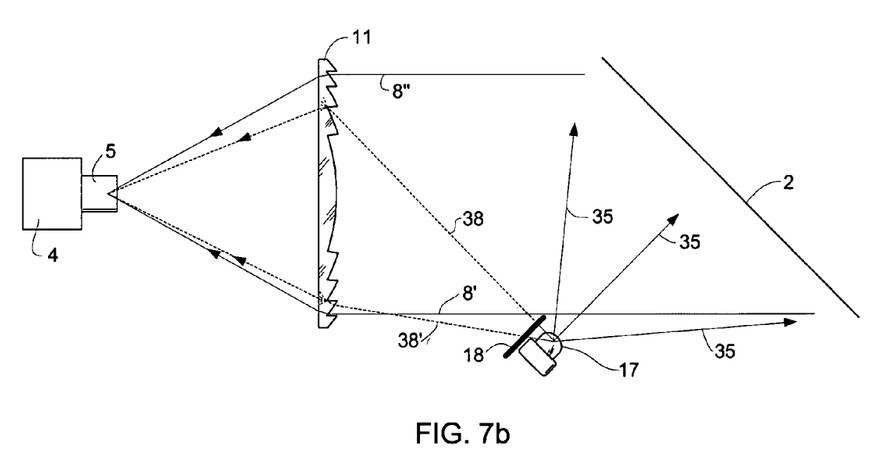

As mentioned above, whereas the prior art configurations with a black background used light sources that sent their drawing surface illumination through the collimator, that approach is not suitable for Fresnel lens collimators, due to the interfering lens flare that would result. The present invention therefore uses light sources between the collimator and the prism to illuminate the drawing surface. Such placement requires light baffles beyond what might have been used with a conventional (non-Fresnel) lens collimator 20, as illustrated in FIGS. 7a and 7b. Note that the LED light sources 17 that direct most of their light rays 35 at the drawing surface 2 are positioned beyond the principal image forming rays 8' and 8'' that bound the camera's image of the drawing surface. Thus the camera cannot image the LEDs directly or by simple refraction through the collimator. As shown in FIG. 7a, the light rays 36 and 37 from the LEDs to a conventional collimator (and therefore all the rays between 36 and 37 as well) would be refracted to locations outside the camera lens 5. Thus they would not interfere with the camera's image of the drawing surface.

However, as FIG. 7b shows, if a Fresnel lens collimator 11 is used, as in the present invention, light rays such as 38 and 38' would, if allowed to reach the collimator, reflect or scatter from its grooves, such that some of that light would enter the camera lens 5 and thereby interfere with the camera's image of the drawing surface. In order to prevent that from happening, a baffle 18 must be added. That baffle must extend far enough to prevent any light from the LEDs from reaching the Fresnel collimator at angles such that it would cause Fresnel lens flare that would be imaged by the camera and thereby degrade the camera's images of tools in contact with the drawing surface.

Note that light sources other than LEDs, such as incandescent or fluorescent lamps could also be used to illuminate the drawing surface, and fiber optics or other light guides could be used to pipe the light from any of these sources to the desired locations. Fresnel or conventional lenses as well as mirrors can also be used to direct that light to provide uniform illumination at the drawing surface. Regardless of the specific light source or how it may be piped in, it is still necessary to prevent its light from illuminating the Fresnel lens collimator directly, and baffles are the preferred means to achieve that.

An alternate means to avoid illuminating the Fresnel collimator is to supply the drawing surface illumination from the edges of the prism itself, relying on total internal reflection to spread that light within the prism to every part of the drawing surface. The major drawback of such an approach is that the edges of large drawing tools, since they prevent total internal reflection and instead send some of that light to the camera, will leave the interior of such tools relatively dark. This self-shadowing makes it impossible to provide even illumination of large drawing tools by relying on illumination through the prism edges alone.

While the preferred embodiments of the improved computer graphic input device have been disclosed, since different implementations of the invention may be preferred by others, and since modifications will naturally occur to those skilled in this art, the scope of the invention should not be interpreted as limited to the illustrated or described embodiments.

I claim:

1. A graphical input device comprising:
   a transparent material with one surface thereof defining a drawing surface, with the index of refraction of the material being greater than the index of refraction of the medium on one side of the drawing surface;
   a camera located in a manner to capture light rays which have been totally internally reflected from said drawing surface whereby an object located on said one side of said drawing surface will be imaged by said camera only when and where said object is in direct contact with said drawing surface; and
   a Fresnel lens collimator mounted between said camera and the material for directing the rays from the object located on the drawing surface;
   wherein said Fresnel lens collimator is located at a distance from said transparent material sufficient to substantially prevent external illumination from interfering with the image of said object captured by said camera.

2. A graphical input device as recited in claim 1 wherein a focal point of said Fresnel lens collimator is substantially coincident with the viewpoint of said camera and the optical axis of said camera is substantially normal to the principal surface of said Fresnel lens collimator whereby the principal image forming rays are parallel when intersecting said drawing surface and are in equal angles with respect to the drawing surface providing uniform sensitivity and whereby the image formed by said camera is free of keystone distortion.

3. A graphical input device as recited in claim 1 wherein baffles shield said Fresnel lens collimator from external illumination.

4. A graphical input device as recited in claim 1 wherein baffles shield said Fresnel lens collimator from internal illumination.

5. A graphical input device as recited in claim 1 wherein illumination is provided between said Fresnel lens collimator and said drawing surface.

6. A graphical input device as recited in claim 1 wherein said transparent material has a second surface defined by Fresnel facets opposed to said drawing surface.

7. A graphical input device as recited in claim 4 wherein a focal point of said Fresnel lens collimator is substantially coincident with the viewpoint of said camera and the optical axis of said camera is substantially normal to the principal surface of said Fresnel lens collimator whereby the principal image forming rays are parallel when intersecting said drawing surface and are in equal angles with respect to the drawing surface providing uniform sensitivity and whereby the image formed by said camera is free of keystone distortion.

8. A graphical input device as recited in claim 4 wherein said transparent material has a second surface defined by Fresnel facets opposed to said drawing surface.

9. A graphical input device as recited in claim 5 wherein a focal point of said Fresnel lens collimator is substantially coincident with the viewpoint of said camera and the optical axis of said camera is substantially normal to the principal surface of said Fresnel lens collimator whereby the principal image forming rays are parallel when intersecting said drawing surface and are in equal angles with respect to the drawing surface providing uniform sensitivity and whereby the image formed by said camera is free of keystone distortion.

10. A graphical input device as recited in claim 5 wherein said transparent material has a second surface defined by Fresnel facets opposed to said drawing surface.

* * * * *